United States Patent [19]
Umezawa et al.

[11] Patent Number: 6,116,711
[45] Date of Patent: Sep. 12, 2000

[54] PRINTER AND PRINTING CONTROL METHOD ACCORDING TO DETECTED AMOUNT OF MEMORY

[75] Inventors: Masahiko Umezawa, Kawasaki; Hiroshi Fukui, Yokosuka; Shinichi Omo, Kawasaki; Akira Kuronuma, Kawasaki; Takayuki Murata, Kawasaki, all of Japan

[73] Assignee: Canon Kabushiki Kaisha, Tokyo, Japan

[21] Appl. No.: 08/967,611

[22] Filed: Nov. 10, 1997

[30] Foreign Application Priority Data

Nov. 11, 1996 [JP] Japan ................................. 8-299016

[51] Int. Cl.[7] .................................................. G01D 15/18
[52] U.S. Cl. .............................................................. 347/14
[58] Field of Search ............................. 347/5, 9, 14, 19, 347/20, 37, 40

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,606,349 | 2/1997 | Droit et al. .................................. 347/4 |
| 5,657,431 | 8/1997 | Plakosh et al. .......................... 395/115 |
| 5,757,948 | 5/1998 | Kumada .................................. 382/277 |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |
| 4-369169 | 12/1992 | Japan . |

*Primary Examiner*—Robert Beatty
*Attorney, Agent, or Firm*—Fitzpatrick, Cella, Harper & Scinto

[57] ABSTRACT

A printer which enables flexible printing control to be performed in conformity with the capacity of a memory installed to satisfy the requirements of a user. In this printer, it is first determined whether the additional memory has been installed or not. Then, the printer further examines the total available capacity of the basic memory and additional memory based upon results of the determination, compares the total capacity with an amount of data necessary to perform printing by a single scan using all ink discharge nozzles of a printhead, decides, based upon the results of the comparison, the capacity of a buffer memory for temporarily storing printing data to be transferred to the printhead, and decides to change resolution in the scanning direction or whether to perform printing by multiscan printing using the buffer memory having the capacity decided or perform printing in which printing using all ink discharge nozzles of the printhead is completed by a single scan of the printhead.

20 Claims, 7 Drawing Sheets

PRINTER AND PRINTING CONTROL METHOD ACCORDING TO DETECTED AMOUNT OF MEMORY

BACKGROUND OF THE INVENTION

This invention relates to a printer and printing control method and, more particularly, to a printer and printing control method for performing printing in accordance with an ink-jet printing method.

A printer equipped with a printhead for performing printing in accordance with an ink-jet printing method may use a plurality of head units each having a plurality of ink discharging nozzles. By increasing the memory capacity of such a printer, complicated control becomes possible in which the ink discharging operation is performed simultaneously from a plurality of the ink discharging nozzles or in which a plurality of the head units are driven simultaneously. The result of such control is an increase in the throughput of the printer.

When the overall manufacturing cost of the printer is taken into consideration, however, the cost of the memory cannot be ignored. The more memory capacity is increased, the greater the increase in the manufacturing cost of the apparatus. From the user standpoint, it is preferable to reduce the cost, thus it is unnecessary to provide a printer with more capabilities than are required by the user.

For example, in the case of a printer capable of full-color printing, there are occasions where color printing is not performed very often. Even a color image sometimes is only a mere color line drawing present in part of an image printed in monochrome. Accordingly, sophisticated color printing capabilities are not always required. In such cases a memory having the minimum required storage capacity is satisfactory for the printing operation performed by the printer.

SUMMARY OF THE INVENTION

Accordingly, it is an object of the present invention to provide a printer and printing control method which allow flexible printing control to be performed in conformity with the capacity of a memory installed to satisfy the requirements of the user.

According to one aspect of the present invention, the foregoing object is attained by providing a printer capable of being provided with additional memory, comprising a printhead, scanning means for scanning the printhead, a basic memory for storing printing data, determination means for determining whether the additional memory has been installed or not, comparison means for examining total capacity of the basic memory and additional memory based upon results of determination by the determination means, and comparing the total capacity with a predetermined threshold value, and printing control means for performing control to decide, based upon results of the comparison by the comparison means, capacity of a buffer memory for temporarily storing printing data to be transferred to the printhead, and to perform printing by the printhead using the buffer memory having the capacity decided.

The printer may further include conveyance means for conveying a printing medium at right angles to the direction in which the printhead is scanned.

Printing may be controlled in such a manner that printing is carried out over the full printing width of the printhead by a single scan of the printhead, or in such a manner that printing is carried out over a width shorter than the printing width of the printhead by a single scan of the printhead, or in such a manner that printing is carried out upon changing printing resolution with respect to the scanning direction of the printhead.

The printhead may be an ink-jet printhead which performs printing by discharging ink, or a printhead which discharges ink utilizing thermal energy and is equipped with a thermal energy generator for producing thermal energy applied to ink.

Further, the printhead may be one which performs color printing, in which the printhead would be constituted by a first printhead for discharging yellow ink, a second printhead for discharging cyan ink, a third printhead for discharging magenta ink and a fourth printhead for discharging black ink.

In a case where the printhead is thus equipped with the first, second, third and fourth printheads, the total capacity of the basic memory and additional memory is further compared with values which are twice, three times and four times the predetermined threshold value, and control is performed in such a manner that printing is carried out using only the fourth printhead, the fourth and third printheads, the fourth, third and second printheads or the fourth, third, second and first printheads, depending on the results of the comparison.

In accordance with the printer as described above, it is determined whether the additional memory has been installed or not, the total capacity of the basic memory and additional memory is examined based upon results of the determination, the total capacity is compared with the predetermined threshold value, the capacity of the buffer memory for temporarily storing printing data to be transferred to the printhead is decided based upon the results of the comparison, and control is performed in such a manner that printing is carried out by the printhead using the buffer memory having the capacity decided.

According to another aspect of the present invention, the foregoing object is attained by providing a printer capable of being provided with additional memory besides a basic memory which stores printing data, comprising a printhead, scanning means for scanning the printhead, first control means for performing control in such a manner that number of pixels printed by a single scan of the printhead scanned by the scanning means is changed depending upon the total capacity of the basic memory and additional memory, and second control means, in a case where the number of pixels printed by a single scan of the printhead has been reduced, for performing control in such a manner that the same area on a printing medium printed on by a single scan of the printhead is printed on by scanning the printhead a plurality of times to thereby complete the printing of the same area.

According to still another aspect of the present invention, the foregoing object is attained by providing a printing control method for performing printing on a printing medium by scanning a printhead serially in a printer environment in which additional memory is capable of being utilized besides a basic memory which stores printing data, comprising a first control step of performing control in such a manner that number of pixels printed by a single scan of the printhead is changed depending upon the total capacity of the basic memory and additional memory, and a second control step, in a case where the number of pixels printed by a single scan of the printhead has been reduced, of performing control in such a manner that the same area on a printing medium printed on by a single scan of the printhead is printed on by scanning the printhead a plurality of times to thereby complete the printing of the same area.

In accordance with the printer and method described above, when printing is performed on a printing medium by serially scanning a printhead in a printer environment in which additional memory is capable of being utilized besides a basic memory which stores printing data, the number of pixels printed by a single scan of the printhead is changed depending upon the total capacity of the basic memory and additional memory. In a case where the number of pixels printed by a single scan of the printhead has been reduced, the same area on the printing medium printed on by a single scan of the printhead is printed on by scanning the printhead a plurality of times to thereby complete the printing of the area.

The invention is particularly advantageous since it is capable of dealing flexibly with the requirements of a variety of user such as users who require a printing operation needing a large amount of memory and users satisfied with a printing operation needing only a small amount of memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
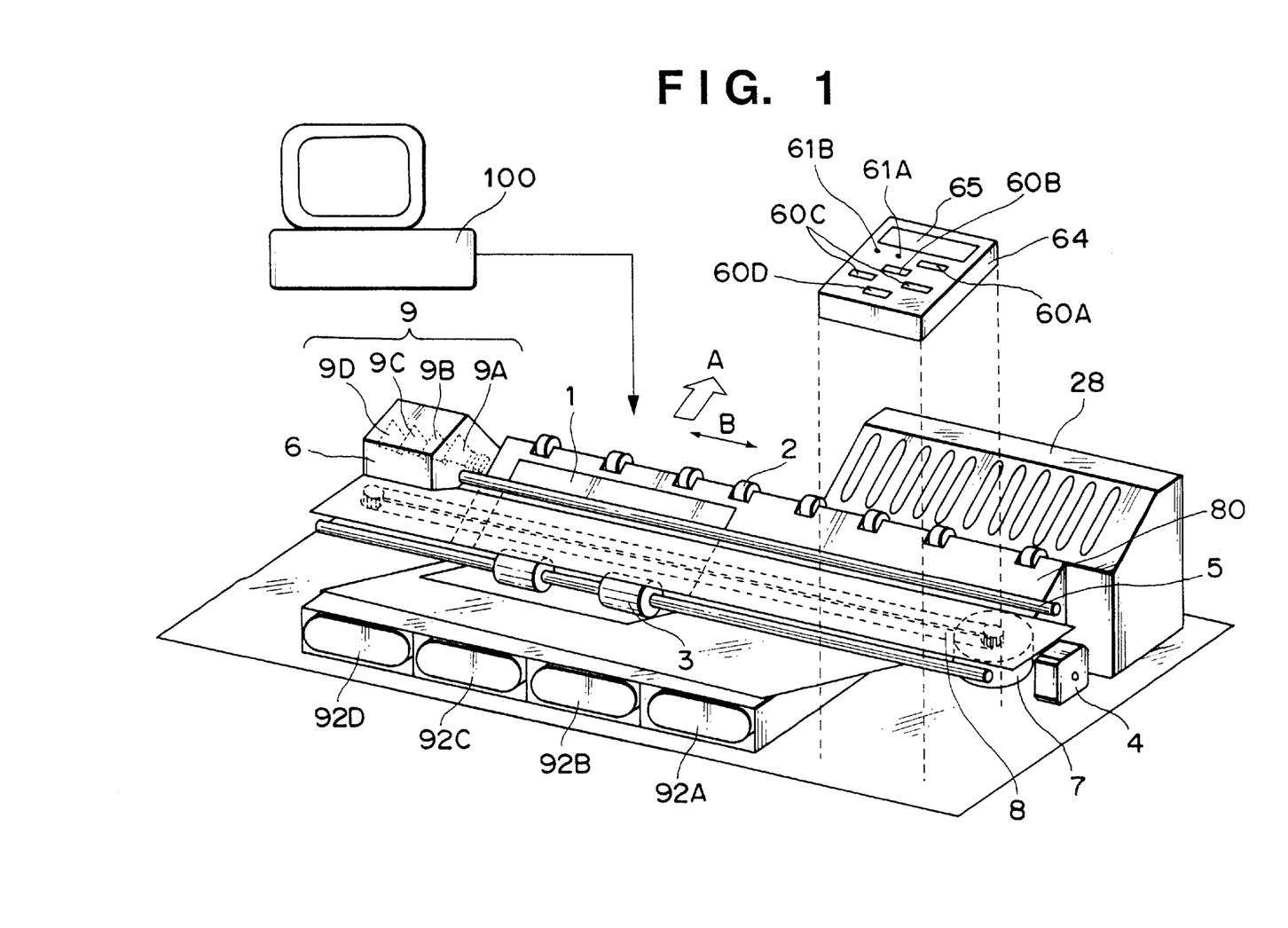
FIG. 1 is an external perspective view showing the construction of a printer, which is a typical embodiment of the present invention, equipped with printheads for performing printing in accordance with ink-jet printing method.

FIG. 1 is an external perspective view showing the construction of a printer, which is a typical embodiment of the present invention, equipped with printheads for performing printing in accordance with ink-jet printing method.

As shown in FIG. 1, the printer includes convey rollers 2, 3, which are arranged above and below a printing area at which printing paper (or other printing medium such as a plastic sheet) 1 is printed on, for conveying the printing paper 1 in the direction of an arrow A, a sheet feed motor 4 for driving the convey rollers 2, 3, a guide shaft 5 situated between the convey rollers 2 and 3 and provided in parallel with the rotary shafts of the convey rollers 2, 3, a carriage 6 moved back and forth (in the directions of arrow B) along the guide shaft 5, a carriage motor 7 for moving the carriage 6, and a belt 8 for transmitting the driving force of the carriage motor 7 to the carriage 6.

Mounted on the carriage 6 are printheads 9A~9D which perform printing by discharging ink droplets in accordance with an ink-jet printing method. (When the four printheads are referred to collectively, the term "printhead 9" will be used.) The printhead 9, which is for printing color images, comprises the four printheads, namely the printhead (K-head) 9A, the printhead (C-head) 9B, the printhead (M-head) 9C and the printhead (Y-head) 9D arranged along the scanning direction of the carriage 6 and provided so as to correspond to inks of the colors black (Bk), cyan (C), magenta (M), and yellow (Y), respectively. A plurality (e.g. 64 or 128) of ink discharge ports are arranged in a vertical row, in a direction which intersects the scanning direction of the carriage 6, on the front side of each of the printheads 9A~9D, namely on a side that opposes the printing surface of the printing paper from across a prescribed distance (e.g., 0.8 mm). The logic circuits of the printheads 9A~9D are identically constructed.

Further, a control panel 64 mounted on the external case (not shown) of the printer is provided with keys such as an online/offline changeover key 60A, a line feed key 60B, a printing mode changeover key 60C and a reset key 60D, LED lamps such as an alarm lamp 61A and power supply lamp 61B, and an LCD 65 for displaying various messages.

The printer further includes a platen 80 and an ink tank 92 which stores ink for printing a desired image on the printing paper. The ink tank 92 includes four ink compartments 92A, 92B, 92C and 92D which store inks of four colors [black (Bk), cyan (C), magenta (M) and yellow (Y)] corresponding to the printheads 9A, 9B, 9C and 9D, respectively.

As will be described below in greater detail, a controller which includes the printer CPU and accompanying components such as a ROM and RAM receives command signals and data signals (printing information) from a host computer (referred to as a "host" below), drives various motors based upon these signals and applies driving power (heating power) to electrothermal transducers (heaters) included in the printheads 9A~9D, whereby the transducers are energized.

Figure 2:
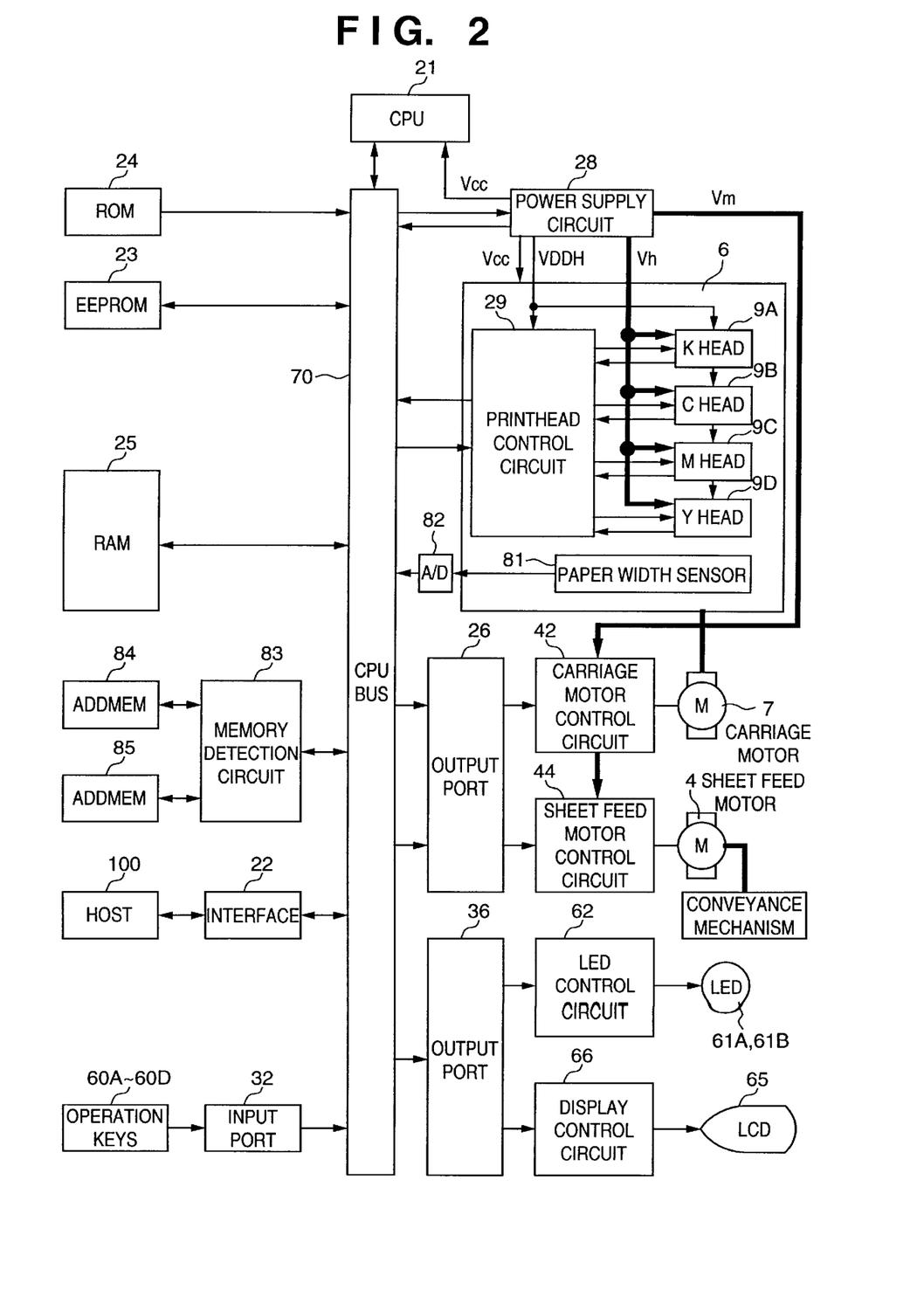
FIG. 2 is a block diagram showing the configuration of control circuitry in the printer illustrated in FIG. 1.

FIG. 2 is a block diagram showing the configuration of control circuitry in the printer illustrated in FIG. 1.

The control circuitry includes a CPU 21 of microprocessor form connected to a host 100 via an interface 22. The CPU 21 accesses a ROM 24 storing a control program, an EEPROM 23 storing an updatable control program, a processing program and data representing various constants and a RAM 25 for storing a command signal and a printing information signal received from the host 100 via an interface 22, and controls the printing operation based upon information that has been stored in these memories. The CPU 21 operates the carriage motor 7 via an output port 26 and carriage motor control circuit 42 to thereby move the carriage 6, and operates the sheet feed motor 4 via the output port 26 and sheet feed motor control circuit 44 to thereby operate a conveyance mechanism which includes the convey rollers 2, 3. Further, the CPU 21 drives the printheads 9A~9D via a printhead control circuit 29 based upon the printing information that has been stored in the RAM 25, thereby making it possible to print a desired image on the printing paper 1.

A power supply circuit 28 outputs a logic drive voltage Vcc (e.g. 5 V) for operating the CPU 21 and printhead control circuit 29, a voltage Vm (e.g. 30 V) for driving the various motors, a heating voltage Vh (e.g. 25 V) for driving the printhead 9, and a back-up voltage VDDH for protecting the printhead 9. The heating voltage is applied to the printhead 9 and the back-up voltage VDDH is applied to the printhead control circuit 29 and printhead 9.

Signals from the keys 60A~60D are sent to the CPU 21 via an input port 32. When an instruction from the CPU 21 is sent to an LED control circuit 62 via the output port 36, the LEDs 61A, 61B light. When an instruction from the CPU 21 is sent to display control circuit 66 via the output port 36, a message is displayed on the LCD 65.

A paper-width sensor 81 mounted on the carriage 6 sends a signal for sensing the width of the printing paper 1 to the CPU 21 via an A/D converting circuit 82.

As shown in FIG. 2, the printer is capable of being additionally provided with two memory units. More specifically, using a memory detection circuit 83, the CPU 21 detects additional memories (ADDMEM) 84, 85 inserted in memory slots (not shown) and is capable of recognizing the additional memories 84, 85 as available memory in addition to the RAM 25. Only one additional memory (84) may be inserted or both additional memories 84, 85 may be inserted.

Accordingly, in this embodiment, available memory capacity may be (1) the capacity of RAM 25, (2) the total capacity of RAM 25 and additional memory 84 or (3) the total capacity of RAM 25, additional memory 84 and additional memory 85.

The printer changes the method of printing control dynamically in accordance with the available memory capacity.

Printing control using the printer having construction set forth above will be described with reference to the flowchart of FIG. 3 and the constitution of a printing data buffer shown in FIGS. 4A and 4B. Among the four printheads constituting the printhead 9, attention will be directed to the K-head 9A for monochrome printing and it will be assumed that the K-head is provided with 128 ink discharge nozzles. Further, it will be assumed that one dot formed by ink discharged from one ink discharge nozzle corresponds to one bit of image data.

When power is introduced to the printer, the CPU 21 calls a RAM check routine from the ROM 24, executes the routine, examines the available memory capacity of the printer and decides the printing control method that conforms to the available memory capacity.

Figure 3:
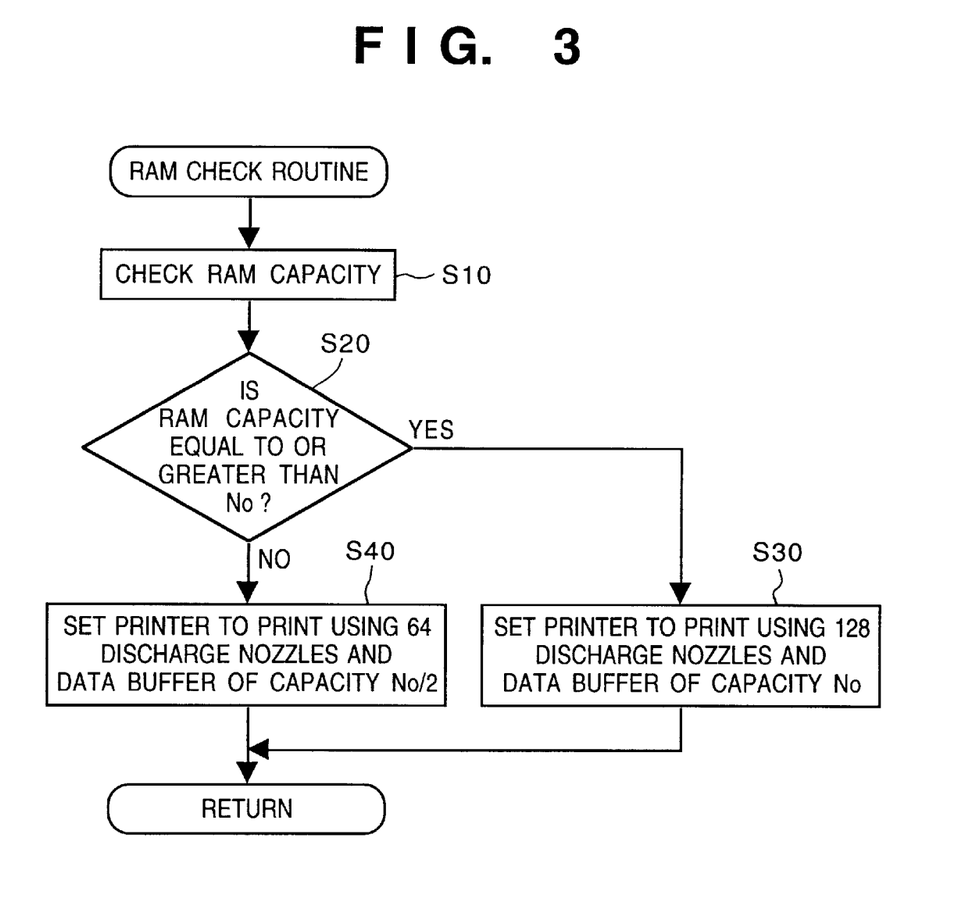
FIG. 3 is a flowchart showing printing setting control which conforms to available storage capacity.

More specifically, at step S10 in FIG. 3, the CPU 21 determines, via the memory detection circuit 83, whether the additional memories (ADDMEM) 84, 85 have been installed and, if they have, determines the storage capacity thereof. Next, at step S20, the CPU 21 determines whether the available memory capacity (M bits) obtained by combining the memory capacity determined at step S10 and the memory capacity of RAM 25 is equal to or greater than a predetermined threshold value ($N_0$).

The program proceeds to step S30 if $M \geq N_0$ holds and to step S40 if $M < N_0$ holds.

Figure 4A:
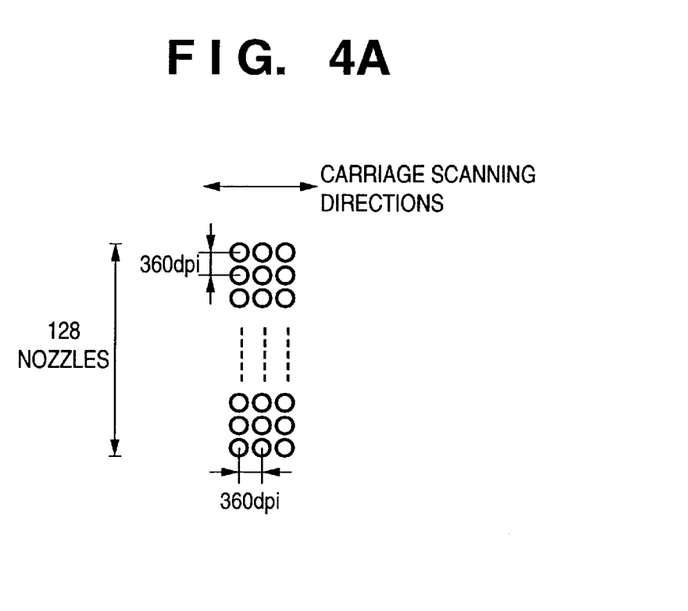
FIGS. 4A and 4B are diagrams showing the constitution of a printing data buffer as well as a printing dot pattern.
Figure 4B:
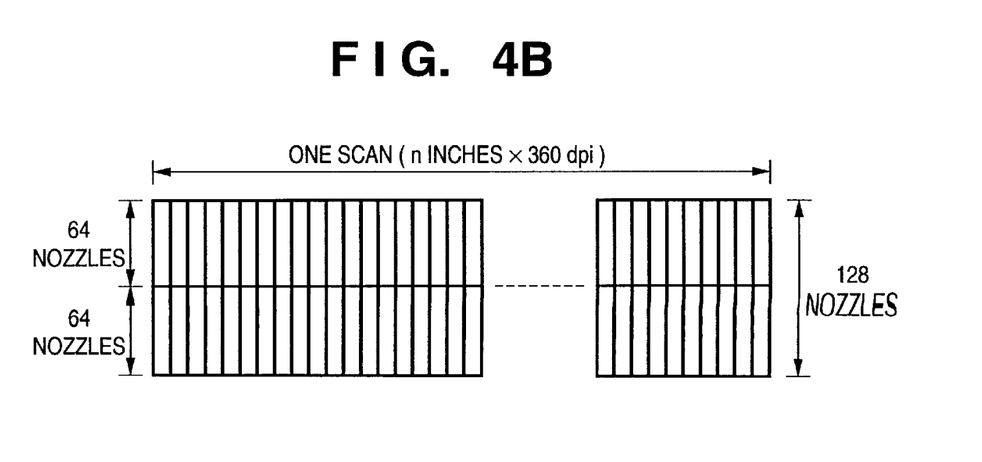

As shown in FIG. 4A, the number of ink discharge nozzles of the printhead is 128. If the density of the discharge nozzle array corresponds to a printing resolution of 360 dpi and printing is possible at 360 dpi in the scanning direction of the carriage 6, the printer usually will require a printing data buffer memory which stores printing data used in a single scan of printing by the K-head 9A. That is, if the maximum printing width of the printer in the scanning direction of the carriage is n inches, as shown in FIG. 4B, then a buffer memory of $128 \times 360 \times n$ ($=N_0$) bits is required.

Accordingly, if $M \geq N_0$ holds, then at step S30 the buffer memory capacity is made $N_0$ and the printer is set to execute printing using all (128) of the discharge nozzles of the K-head 9A in a single scan. On the other hand, if $M < N_0$ holds, then at step S40 the buffer memory capacity is made $N_0/2$ and the printer is set to execute printing (multiscan printing) using half (64) of the discharge nozzles of the K-head 9A in a single scan. Here, printing corresponding to all 128 of the discharge nozzles is completed by two scans.

Thus, in accordance with the embodiment described above, additional memory capacity is detected and it is possible to select an appropriate printing operation that is based upon the available memory capacity obtained as the result of detecting memory capacity.

In this embodiment, only the case where the buffer memory capacity is made $N_0/2$ if $M < N_0$ holds is described. However, this does not pose any limitation of the present invention. For example, the buffer memory capacity may be made $N_0/3$, $N_0/4$ or the like if $M < N_0$ holds.

Figure 5:
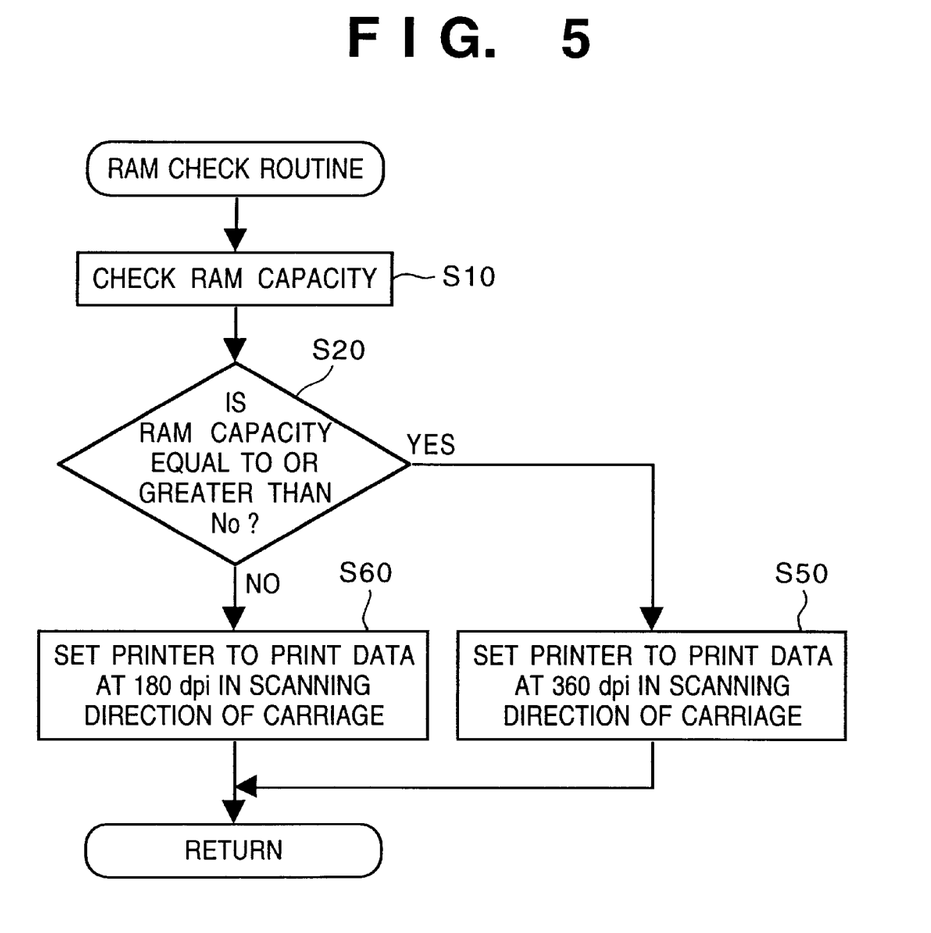
FIG. 5 is a flowchart illustrating a modification of the processing shown in FIG. 3.

It should be noted that control for selecting the appropriate printing operation based upon the available memory capacity is not limited to control for setting a line buffer or multiscan printing. For example, as illustrated in the flowchart of FIG. 5 and in the constitution of the printing data buffer illustrated in FIG. 6, an arrangement may be adopted in which the printing resolution in the scanning direction of the carriage is controlled based upon the available memory capacity. Steps in the flowchart of FIG. 5 identical with those in the flowchart of FIG. 3 are designated by the same step numbers.

Figure 6A:
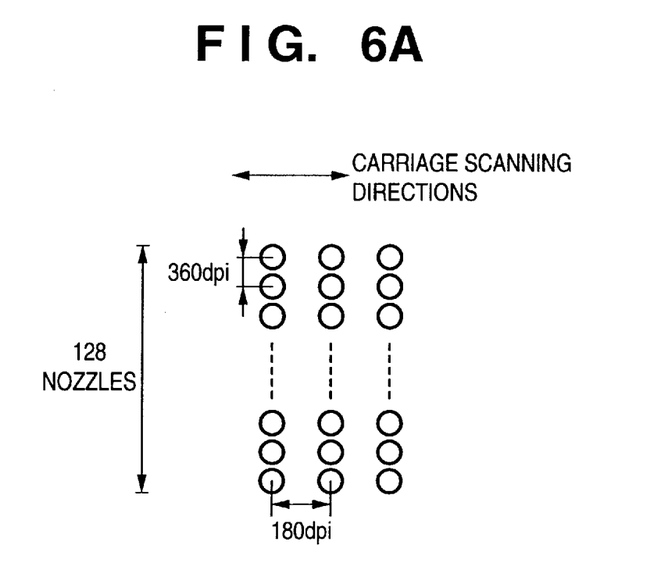
FIGS. 6A and 6B are diagrams showing the constitution of a printing data buffer as well as a printing dot pattern corresponding to the modification of FIG. 5.
Figure 6B:
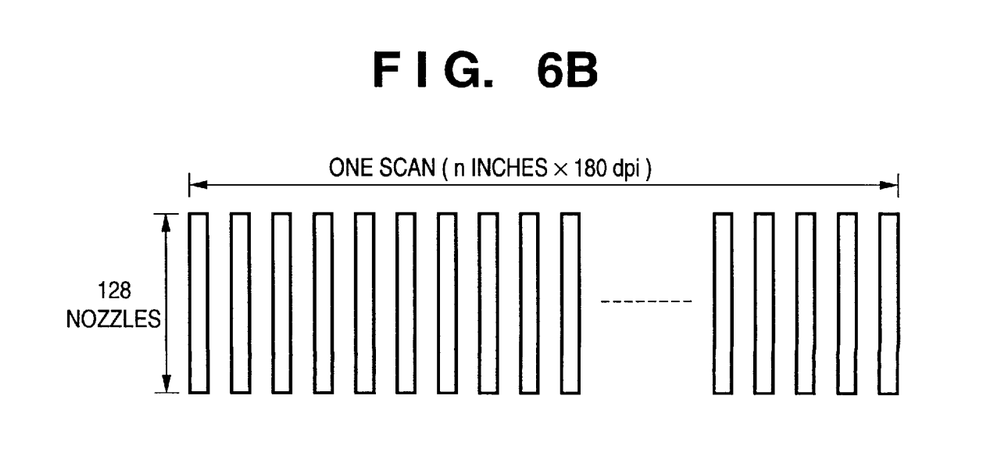

In accordance with this control, the processing of step S50 is executed if $M \geq N_0$ holds. Here, the printing resolution in the scanning direction of the carriage is made 360 dpi and the printer is set to execute printing using the buffer memory shown in FIG. 4A having $128 \times 360 \times n$ ($=N_0$) bits. On the other hand, if $M < N_0$ holds, then at step S60 the printer is set to perform printing at a resolution of 180 dpi in the carriage scanning direction using a buffer memory having a storage capacity of $128 \times 180 \times n$ ($=N_0/2$) bits, which is obtained by adopting a buffer construction that down-samples and stores printing data in the scanning direction of the carriage. Such a buffer is shown in FIG. 6B. In this case, therefore, the dots printed by a single scan of the K-head 9A appear as shown in FIG. 6A.

Other Embodiment

In this embodiment, attention is directed to the four printheads, namely the K-head 9A, the C-head 9B, the M-head 9C and the Y-head 9D, and control is performed so as to select an appropriate printing operation based upon the available memory capacity. This control will be described with reference to the flowchart of FIG. 7.

Here, it is assumed that each head is provided with 128 ink discharge nozzles. Further, it will be assumed that one dot formed by ink discharged from one ink discharge nozzle corresponds to one bit of image data. Steps in the flowchart of FIG. 7 identical with those in the flowcharts of FIGS. 3 and 5 are designated by the same step numbers. Furthermore, as described in the foregoing embodiment, let $N_0$ represent the capacity of a buffer memory necessary for printing by a single scan of one printhead at the printing resolution of 360 dpi.

Figure 7:
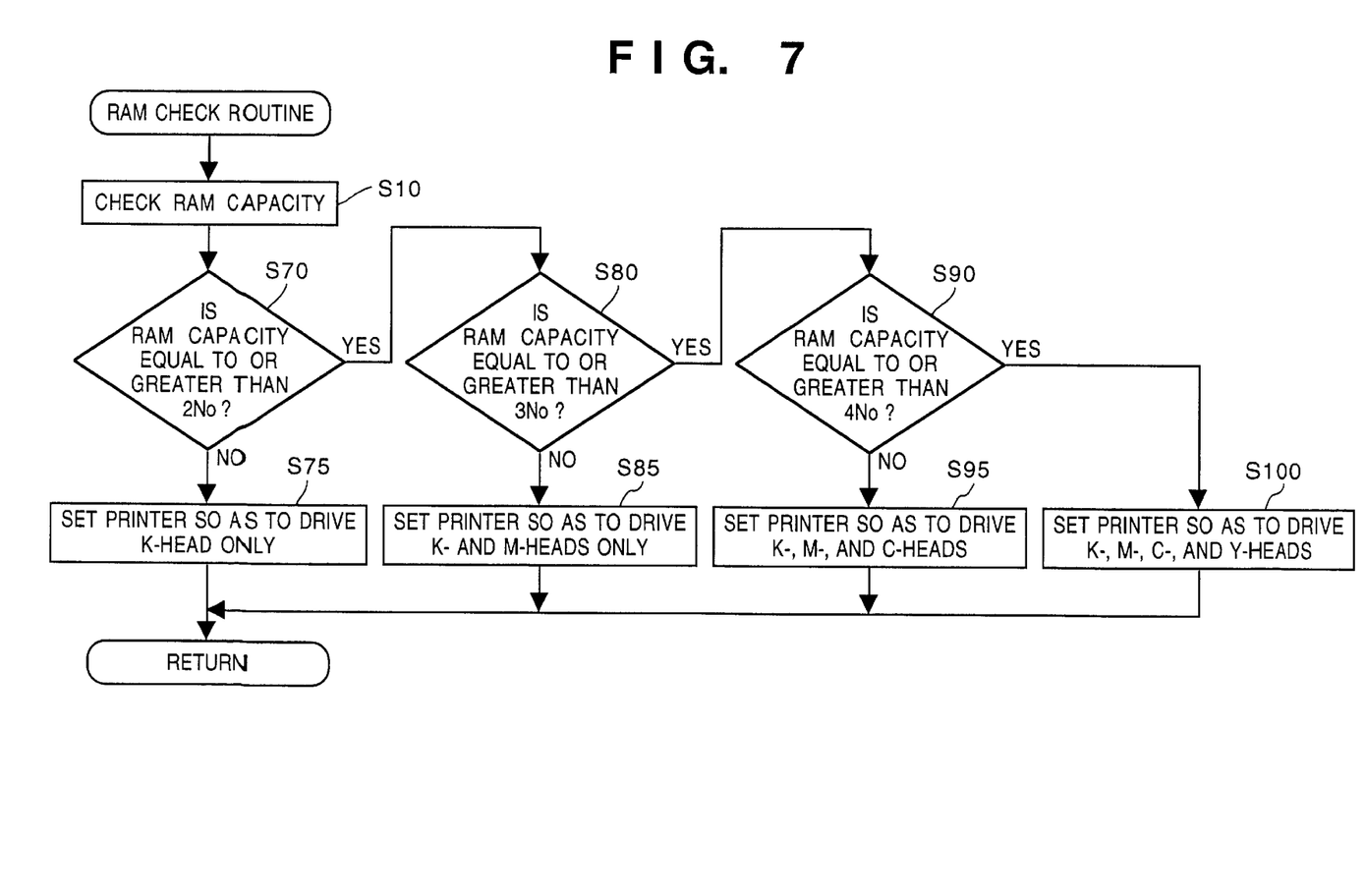
FIG. 7 is a flowchart showing printing setting control which conforms to available storage capacity in accordance with another embodiment.

After the available memory capacity (M) is found at step S10, it is determined at step S70 whether or not the capacity (M) is equal to or greater than a predetermined threshold value ($2 \times N_0$). If $M < 2 \times N_0$ holds, the program proceeds to step S75, at which the printer is set so as to execute printing by the K-head 9A alone. If $M \geq 2 \times N_0$ holds, on the other hand, the program proceeds to step S80.

It is determined at step S80 whether or not the capacity (M) is equal to or greater than a predetermined threshold value ($3 \times N_0$). If $M < 3 \times N_0$ holds, the program proceeds to step S85, at which the printer is set so as to execute printing solely by the K-head 9A and M-head 9C. If $M \geq 3 \times N_0$ holds, on the other hand, the program proceeds to step S90.

It is determined at step S90 whether the capacity (M) is equal to or greater than a predetermined threshold value ($4 \times N_0$). If $M < 4 \times N_0$ holds, the program proceeds to step S95, at which the printer is set so as to execute printing by the K-head 9A, C-head 9B and M-head 9C. If $M \geq 4 \times N_0$ holds, on the other hand, the program proceeds to step S100. Here the printer is set so as to execute printing by all of the printheads, namely the K-head 9A, C-head 9B, M-head 9C and Y-head 9D.

Thus, in accordance with this embodiment, additional memory capacity is detected and it is possible to select, based upon the available memory capacity obtained as the result of detecting memory capacity, the number of printheads to be used in executing printing.

Accordingly, additional memory is provided in a case where it is desired to perform color printing. Also, no additional memory need be provided if it is desired to perform printing in black and white only. In this case, it is sufficient to execute printing using only the basic memory (RAM 25). The user thus need only change the memory capacity depending the purpose of use.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices or to an apparatus comprising a single device. Furthermore, it goes without saying that the invention is applicable also to a case where the object of the present invention can be achieved by supplying a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for supplying the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus capable of being provided with an additional memory, comprising:
    a printhead;
    scanning means for scanning said printhead;
    a basic memory for storing printing data;
    determination means for determining a capacity of said additional memory which has been installed;
    check means for checking a total capacity of said basic memory and said additional memory based upon results by said determination means; and
    printing control means for performing control to decide, based upon results by said check means, a capacity of a buffer memory for temporarily storing printing data to be transferred to said printhead, and to perform printing by said printhead using said buffer memory having said capacity decided,
    wherein said printing control means performs control in such a manner that printing is carried out upon changing resolution with respect to a scanning direction of said printhead.

2. The apparatus according to claim 1, further comprising conveyance means for conveying a printing medium at right angles to scanning direction of said printhead.

3. The apparatus according to claim 1, wherein said printing control means performs control in such a manner that printing is carried out over full printing width of said printhead by a single scan of said printhead.

4. The apparatus according to claim 1, wherein said printing control means performs control in such a manner that printing is carried out over a width shorter than printing width of said printhead by a single scan of said printhead.

5. The apparatus according to claim 1, wherein said printhead is an ink-jet printhead which performs printing by discharging ink.

6. The apparatus according to claim 1, wherein said printhead is a printhead which discharges ink utilizing thermal energy and is equipped with thermal energy generator for generating thermal energy applied to ink.

7. The apparatus according to claim 1, wherein said printhead is a printhead which performs color printing.

8. The apparatus according to claim 7, wherein said printhead includes:
    a first printhead unit for discharging yellow ink;
    a second printhead unit for discharging cyan ink;
    a third printhead unit for discharging magenta ink; and
    a fourth printhead unit for discharging black ink.

9. The apparatus according to claim 8, further comprising comparison means for comparing said total capacity of said basic memory and said additional memory with values which are twice, three times and four times a predetermined threshold value, and
    wherein said print control means performs printing control in such a manner that printing is carried out using only said fourth printhead, said fourth and third printheads, said fourth, third and second printheads or said fourth, third, second and first printheads, depending on the results by said comparison means.

10. The apparatus according to claim 9, wherein said determination means and said comparison means are operated when power is introduced to said apparatus.

11. A printing apparatus capable of being provided with an additional memory besides a basic memory which stores printing data, comprising:
    a printhead;
    scanning means for scanning said printhead; and
    control means for performing control in such a manner that a number of pixels printed by a single scan of said printhead scanned by said scanning means is changed depending upon a total capacity of said basic memory and said additional memory,
    wherein said control means, in a case where said number of pixels printed by a single scan of said printhead has been reduced, performs control in such a manner that a same area on a printing medium printed on by a single scan of said printhead is printed on by scanning said printhead a plurality of times to thereby complete the printing of said same area.

12. The apparatus according to claim 11, wherein said control means changes said number of pixels by changing printing resolution with respect to a direction of scanning performed by said scanning means.

13. The apparatus according to claim 11, wherein said control means changes said plurality of times said printhead scans said same area, depending upon said total capacity of said basic memory and said additional memory.

14. The apparatus according to claim 11, wherein said printhead is an ink-jet printhead which performs printing by discharging ink.

15. The apparatus according to claim 11, wherein said printhead is a printhead which discharges ink utilizing thermal energy and is equipped with thermal energy generator for generating thermal energy applied to ink.

16. The apparatus according to claim 11, wherein said printhead is a printhead which performs color printing.

17. The apparatus according to claim 16, wherein said printhead includes:
a first printhead unit for discharging yellow ink;
a second printhead unit for discharging cyan ink;
a third printhead unit for discharging magenta ink; and
a fourth printhead unit for discharging black ink.

18. The apparatus according to claim 11, further comprising memory capacity checking means for checking said total capacity of said basic memory and said additional memory when power is introduced to said apparatus.

19. A printing control method for performing printing on a printing medium by scanning a printhead serially in a printer environment in which additional memory is capable of being utilized besides a basic memory which stores printing data, comprising:

a first control step of performing control in such a manner that number of pixels printed by a single scan of said printhead is changed depending upon the total capacity of the basic memory and additional memory; and a second control step, in a case where the number of pixels printed by a single scan of said printhead has been reduced, of performing control in such a manner that the same area on a printing medium printed on by a single scan of said printhead is printed on by scanning said printhead a plurality of times to thereby complete the printing of said same area.

20. A printing method applied to a printing apparatus capable of being provided with an additional memory, said apparatus comprising a printhead, scanning means for scanning the printhead and a basic memory for storing printing data, said method comprising the steps of:

determining a capacity of said additional memory which has been installed;

checking a total capacity of said basic memory and said additional memory based upon a result of the determination; and performing control to decide, based upon a result of said checking, a capacity of a buffer memory for temporarily storing printing data to be transferred to said printhead, and to perform printing by said printhead using said buffer memory having said capacity decided, and further performing control in such a manner that printing is carried out upon changing printing resolution with respect to a scanning direction of said printhead.

* * * * *